United States Patent [19]

Leonard

[11] Patent Number: 5,174,539
[45] Date of Patent: Dec. 29, 1992

[54] REVERSIBLE MOUNTING BRACKET FOR ELECTRONIC DEVICES

[75] Inventor: John P. Leonard, Fort Worth, Tex.

[73] Assignee: Tandy Corporation, Fort Worth, Tex.

[21] Appl. No.: 711,029

[22] Filed: Oct. 6, 1991

[51] Int. Cl.⁵ ............................................. F16M 13/00
[52] U.S. Cl. .................................. 248/558; 248/300; 439/571
[58] Field of Search ................. 248/300, 301, 205.1, 248/309.1, 310, 311.2, 316.8, 176, 558; 439/297, 298, 571, 569, 570

[56] References Cited

U.S. PATENT DOCUMENTS

| | | |
|---|---|---|
| 162,122 | 2/1951 | Broeren . |
| 298,604 | 11/1988 | Newton . |
| 306,133 | 2/1990 | Zupancic . |
| 1,691,213 | 11/1928 | Smith .................................. 248/310 |
| 1,767,575 | 6/1930 | Bujack . |
| 2,974,918 | 3/1961 | Voigtlander . |
| 3,951,368 | 4/1976 | Appleton ........................ 248/300 X |
| 4,371,083 | 2/1983 | Zingrini et al. . |
| 4,475,785 | 10/1984 | Muller et al. ........................ 439/298 |
| 4,979,909 | 12/1990 | Andrews ............................ 211/26 X |
| 5,009,385 | 4/1991 | Burgener et al. ................ 248/310 X |

Primary Examiner—Ramon O. Ramirez
Attorney, Agent, or Firm—Warren B. Kice

[57] ABSTRACT

A bracket for mounting components in a housing in which a first set of two legs extend from and substantially perpendicular to one surface of a plate and a second set of at least two legs extend from and perpendicular to the opposite surface of the plate. The bracket is connectable to the floor of the housing to support a first component at a predetermined height in said housing and is reversible to support a component of a greater height than the first component.

42 Claims, 3 Drawing Sheets

REVERSIBLE MOUNTING BRACKET FOR ELECTRONIC DEVICES

BACKGROUND OF THE INVENTION

This invention relates to a mounting bracket for mounting a component in a housing of an electronic device, such as a computer, and more particularly to such a bracket for accommodating components of various heights within a limited space in the housing.

Many electronic devices include a multitude of components which must be carefully and precisely mounted within the limited confines of a housing. For example, modern computer systems, including personal and laptop computers, incorporate one or more mass storage devices, usually in the form of floppy or hard disk drives, of variable complexity and size. These components must be mounted in the housing within very limited space restrictions, especially with respect to height, yet must be easily removable for replacement, repair or other purposes. Also, some of the components, such as disk drives, have to be accessed through slots in the housing and therefore must be mounted at a precise predetermined location within the housing.

A wide variety of mounting brackets and other devices have been used to enable these type of components to be mounted in the above manner. For example, U.S. Pat. No. 4,979,909 discloses the use of resilient mounting members provided on the sides of a disk drive which are received within corresponding openings in the inner wall of the computer housing.

However, prior art mounting devices, including those of the above type, are usually dedicated to mounting a single electronic component having specific dimensions and cannot be used for different sized components. This limitation becomes particularly acute in connection with computers since it is often desirable to replace, or upgrade, the disk drives with disk drives of a different size after the computer is put in use.

SUMMARY OF THE INVENTION

It is therefore an object of the present invention to provide a mounting bracket for mounting components in a housing of an electronic device defining an enclosed space of a predetermined limited height.

It is a further object of the invention to provide a mounting bracket of the above type for mounting the component at a precise height in the housing of the electronic device.

It is a still further object of the invention to provide a mounting bracket of the above type which can accommodate components of different sizes within a limited space in the housing.

Toward the fulfillment of these objects, the mounting bracket of the present invention includes at least two legs extending from one surface of a plate member and at least two legs extending from the opposite surface of the plate member. When it is desired to mount a component of a standard size at a predetermined height in the housing the legs extending from one surface are connected to the floor of the housing and the component rests on the plate member and extends between the other two legs. However, when it is desired to mount a component of a greater height which, when mounted in the above manner, would exceed the height of the housing, the bracket of the present invention can be reversed to accommodate the other component within the height of the housing.

BRIEF DESCRIPTION OF THE DRAWINGS

The above description as well as further objects, features and advantages of the present invention will be more fully appreciated by reference to the following detailed description of the presently preferred, but none the less illustrative, embodiment in accordance with the present invention when taken in conjunction with the accompanying drawings wherein.

DESCRIPTION OF THE PREFERRED EMBODIMENT

Figure 1:
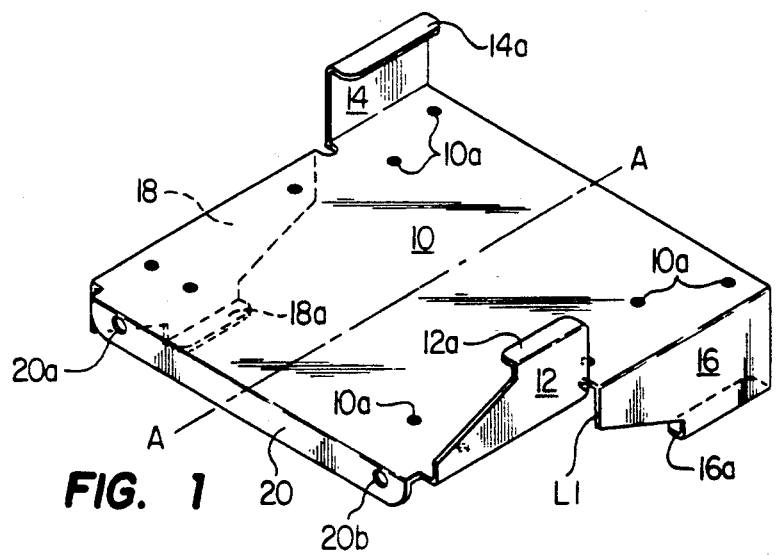
FIG. 1 is a perspective view of the mounting bracket of the present invention.

FIG. 1 of the drawings depicts the mounting bracket of the present invention, which, for the purposes of example, is utilized to mount an internal component, such as a disk drive, within the chassis or housing of an electronic device, such as a computer, at a predetermined height in the housing. The bracket includes a rectangular plate 10 having two legs 12 and 14 extending from the upper surface of the plate, as viewed in FIG. 1, and two legs 16 and 18 extending from the lower surface of the plate. The legs 12 and 16 extend from one side marginal portion of the plate 10 and the legs 14 and 18 extend from the other side marginal portion thereof. According to a preferred embodiment, the legs 12, 14, 16 and 18 are formed integrally with the plate 10 by cutting and bending the opposite side marginal portions of the plate 10 as follows.

The legs 12 and 16 are formed by cutting a side marginal portion of the plate 10 along a line L1 which extends in a direction perpendicular to the side edge of the plate, to divide the marginal portion into two sections. One of these sections is bent upwardly, as viewed in FIG. 1, so that it extends from the upper plate surface and the other section is bent downwardly so that it extends from the lower plate surface. The sections thus formed are trimmed by cutting away portions of these sections to form the legs 12 and 16 with the trimming being such that the leg 16 has a greater " height", or distance from its free end to the plate 10, than that of the leg 12, for reasons to be described.

The legs 14 and 18 are formed in essentially the same manner, with the leg 14 extending from the upper plate surface and the leg 18 extending from the lower plate surface. The leg 14 is trimmed to the same height as the leg 12 and the leg 18 is trimmed to the same height as the leg 16.

The aforementioned trimming is such that the width of each leg 12, 16 and 18 tapers toward its free end portion so that the latter portion is of a lesser width than that of the base portion. The free end portions of the legs 12, 14, 16 and 18, are bent inwardly to form tabs, or "feet", 12a, 14a, 16a and 18a, respectively, which extend perpendicular to their respective legs for reasons to be described.

A mounting flange 20 extends from the front edge portion of the plate 10, downwardly from the plate as viewed in FIG. 1 and perpendicular to the plate. A pair of spaced openings, 20a and 20b, extend through the flange 20 for reasons to be described. According to a preferred embodiment, the flange 20 is formed integrally with the plate 10 by bending the front marginal portion of the plate downwardly.

A plurality of mounting holes 10a extend through the plate 10 for receiving bolts, fasteners or like which extend into the component to be mounted to secure the component to the plate.

Figure 2:
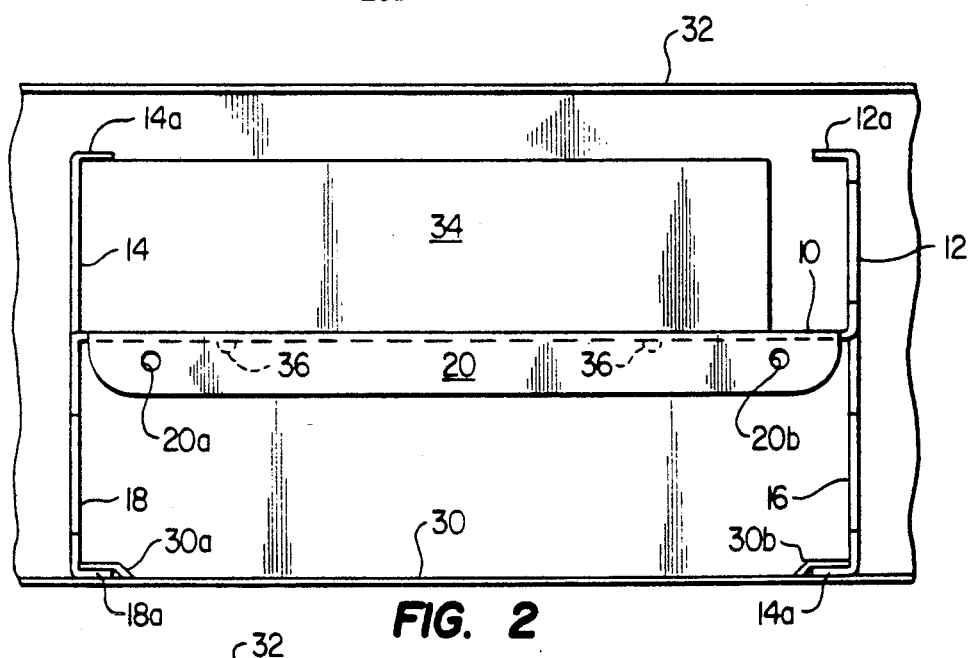
FIG. 2 is an enlarged, end elevational view of the bracket of FIG. 1.

FIG. 2 depicts the mounting bracket of FIG. 1 shown connected between a bottom plate, or floor, 30 and a horizontal top plate 32 of a housing of an electronic device, such as a computer. The bottom plate 30 is provided with two spaced, longitudially extending flanges, or tabs, 30a and 30b, each of which define a elongated channel for receiving the tabs 18a and 16a, of the legs 18 and 16, respectively.

Although not clear from the drawings, it is understood that the openings 20a and 20b of the mounting flange 20 receive bolts, fasteners or the like to secure the flange 20 to an upright wall (not shown) of the above-mentioned housing which extends perpendicular to the bottom plate 30 and the top plate 32.

As also shown in FIG. 2, a component of a standard, predetermined height, such as a floppy disk drive 34, is mounted on the upper surface of the plate 10 by a plurality of fasteners 36 extending through the openings 10a in the plate and into appropriately formed openings in the disk drive 34. In the mounted position shown, the plate 10 and the upright legs 12 and 14 form a receptacle for the disk drive 34 which extends between the legs 12 and 14 and in abuttment with the inner wall of the leg 14 so that the tab 14a extends over the upper surface of the disk drive. Thus, precise vertical and lateral alignment of the disk drive 34 relative to the housing is insured to enable the disk drive to align with a slot (not shown) in the housing to permit user access to the disc drive.

Figure 3:
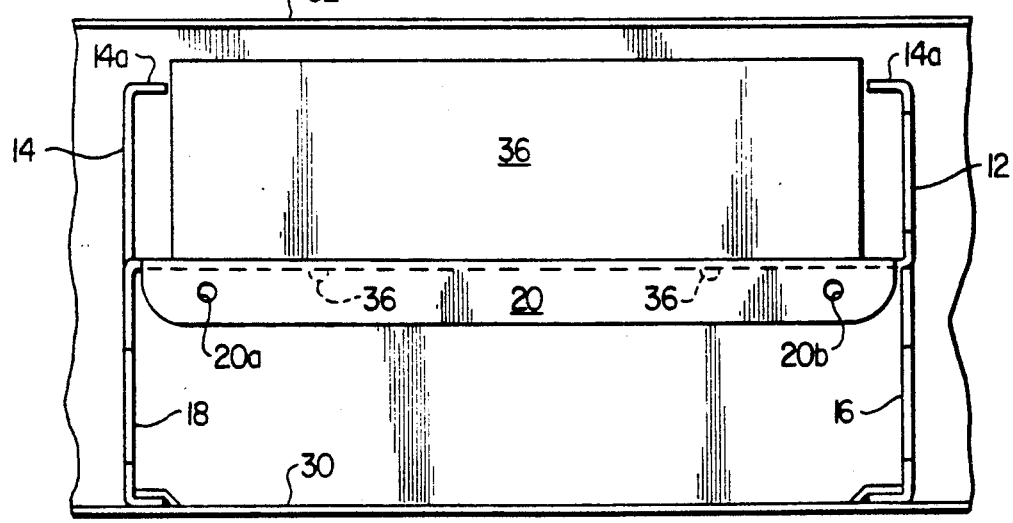
FIG. 3 is a view similar to FIG. 2, but showing the bracket of FIGS. 1 and 2 mounting a component of a different size.

FIG. 3 depicts the bracket of the present invention in the same position as that of FIG. 2 but receiving a component, such as a hard disk drive 36, which has a greater height than the disk drive 34 of FIG. 2. It is noted that in this mode, the upper surface of the disk drive 36 projects slightly above the tabs 12a and 14a of the legs 12 and 14, respectively, and is spaced slightly below the top plate 32 of the housing. Since it is contemplated that the disk drive 36 would not need to be user-accessible through a slot in the housing, it can be shifted slightly to the right from the position of the disk drive 34 to a position where it clears the tab 14a and is centered between the legs 12 and 14.

It can be appreciated from a view of FIG. 3 that it would be impossible to accommodate internal components such as a disk drive of a height much greater than the height of the disk drive 36 due to the limited vertical clearance between the upper surface of the disk drive and the top plate 32 of the housing. However, with the bracket of the present invention components of a greater height can be accomodated. To this end, and with reference to FIG. 1, the device of the present invention is reversed by rotating it about a horizontal axis A—A for 180 degrees, to the position shown in FIGS. 4 and 5. In this latter position, the shorter legs 12 and 14 extend below the plate 10 with their tabs 12a and 14a engaging the tabs 30a and 30b, respectively, of the bottom plate 30 of the housing. The legs 16 and 18 extend upwardly from the plate member 10 to form a receptacle for another component, such as a disk drive 38, which has a greater height than the disk drive 36 of FIG. 3.

Figure 4:
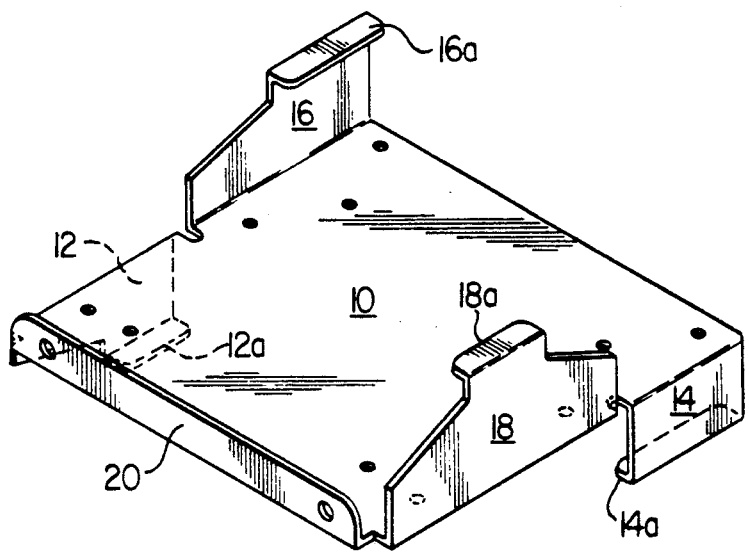
FIG. 4 is a view similar to FIG. 1, but showing the bracket of FIGS. 1 and 2 after being rotated to its alternate position.
Figure 5:
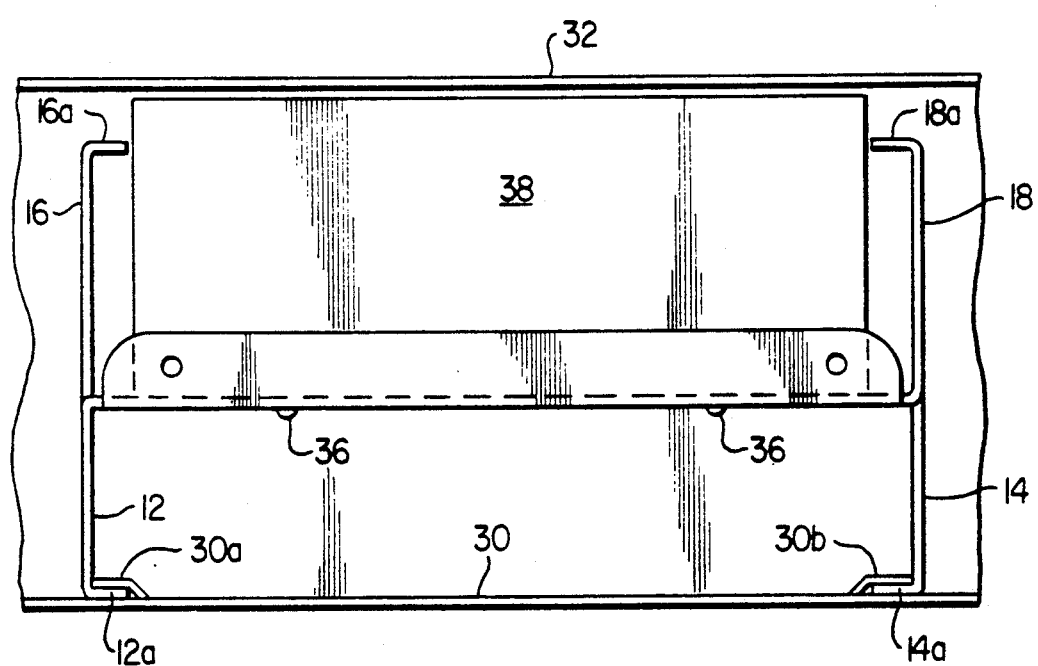
FIG. 5 is a view similar to FIGS. 2 and 3, but showing the bracket in the position of FIG. 4 mounting an electronic component of still another size.

In the embodiment of FIGS. 4 and 5, the flange 20 is also mounted to the corresponding wall of the housing by inserting fasteners through the mounting holes 20a and 20b. In this position, the disk drive 38 can be mounted on the plate member 10 by the fasteners 36 and can be of a greater height than that of the disk drives 34 and 36 and yet be accommodated within the limited vertical space between the bottom plate 30 and the top plate 32.

It is noted that the "footprint" of the tabs 16a and 18a on the bottom plate 30 in the reversed position of FIG. 4 is the same as the footprint of the tabs 12a and 14a in the position of FIG. 1, so that the tabs 30a and 30b will accommodate both sets oof tabs. Also, the mounting holes 20a and 20b of the mounting flange 20 are located at the same elevation in both the position of FIGS. 1–3 and the position of FIGS. 4 and 5, since they are spaced equal vertical distances from the tabs 12a and 14a on the one hand, and the tabs 16a and 18a on the other hand.

In designing the mounting bracket of the present invention, the length of the shorter legs 12 and 14 are determined in the following manner. When the bracket is in the position of FIG. 2, the legs 12 and 14 should be long enough so that the tab 14a of the leg 14 extends in close engagement with the upper surface of the standard disk drive 34 as shown, yet should be short enough so that a disk drive 38 of an increased height can be accommodated when the bracket is turned over to the position of FIGS. 4 and 5.

Thus, the bracket of present invention, in its normal upright position, enables a standard floppy disc drive, or similar component, to be mounted at a precise, predetermined height in the housing, yet can be reversed to accomodate a component, such as a hard disc device, of a greater height which, if mounted in the upright position of the bracket, would exceed the height of the housing.

Figure 6:
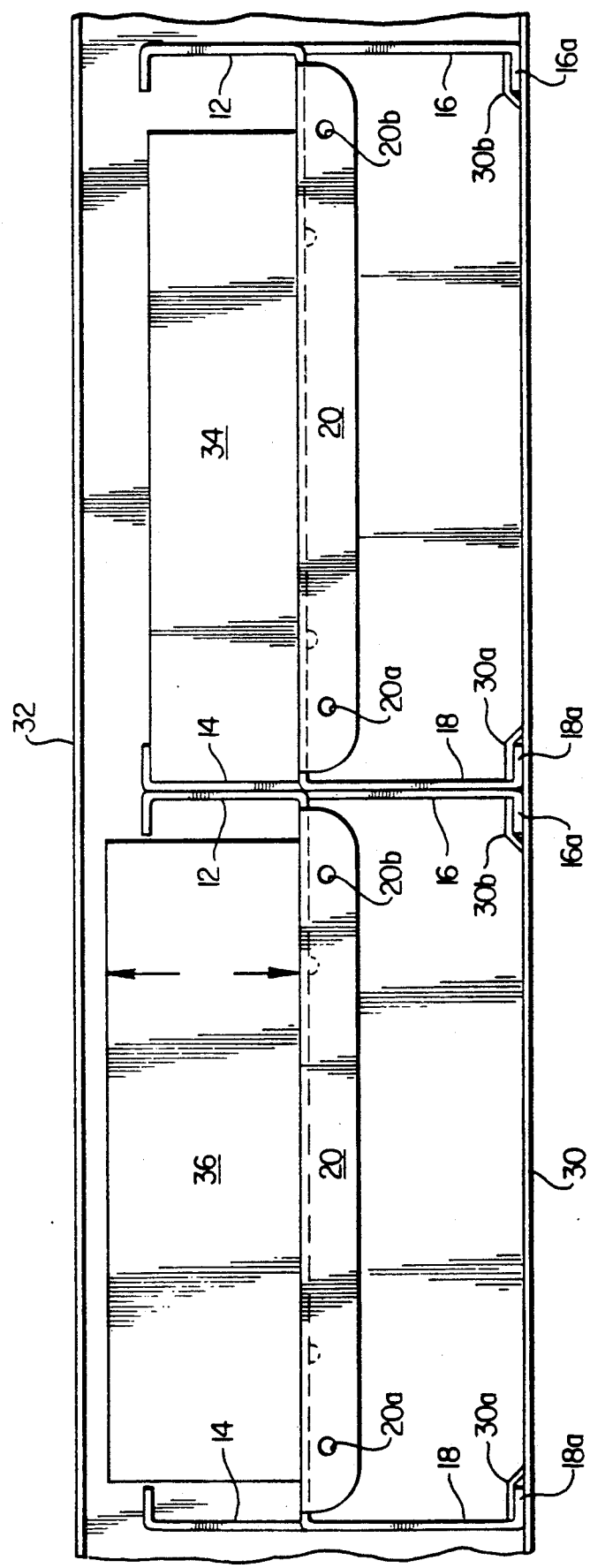
FIG. 6 is an end view of the brackets of FIGS. 2 and 3 mounted in a side-by-side relationship.

FIG. 6 depicts two brackets of the present invention positioned to accommodate two components such as the disk drive 34 of FIG. 2 and the disk drive 36 of FIG. 3. As shown, the brackets of the present invention are placed in a closely abutting, side-by-side arrangement with the legs 18 and 14 of one bracket extending adjacent to, and in abuttment with, the legs 12 and 16 of the adjacent bracket. Of course it is understood that one bracket can be mounted in the position shown in FIG. 6, while the other can be rotated to the position shown in FIGS. 4 and 5 to accommodate the relatively tall disk drive 38. In either case, an extra set of tabs 30a and 30b would be provided on the bottom plate 30 of the housing.

It is understood that several variations may be made on the foregoing without departing from the scope of the invention. For example, the present invention is not limited to two legs extending from each surface of the plate. Also, although the bracket of the present invention is shown and described as being connected to the housing by connecting the mounting flange to a wall of the housing and by connecting the legs to the floor of the housing, it is understood that only one such connection can be used within the scope of the invention.

Other modifications, changes and substitutions are intended in the foregoing disclosure and in some instances some features of the invention will be employed without a corresponding use of other features. Accordingly, it is appropriate that the pending claims be construed broadly and in a manner consistent with the scope of the invention.

What is claimed is:

1. A bracket for mounting a component in a housing defining an enclosed space of a predetermined height, said bracket comprising a plate member, a first set of at least two relatively long leg members extending from, and substantially perpendicular to, one surface of said plate member, a second set of at least two relatively short leg members extending from, and substantially perpendicular to, the opposite surface of said plate member, means for connecting at least one of said members to said housing with said leg members of said first set engaging the floor of said housing to support a component on said plate member at a predetermined height in said housing, and means for connecting at least one of said members to said housing with said leg members of said second set engaging said floor to support a second component on said plate member of a height which, if mounted on said plate member with said leg members of said first set engaging said floor, would exceed said predetermined height.

2. The bracket of claim I wherein said plate member and said leg members of said second set form a receptacle for said first component when said leg members of said first set engage said floor, and wherein said plate member and said leg members of first set form a receptacle for said second component when said legs of said second set engage said floor.

3. The bracket of claim 1 wherein said leg members are integral with said plate member and said leg members of said first set are formed by bending marginal portions of said plate member in a first direction, and said leg members of said second set are formed by bending marginal portions of said plate member in a second direction opposite said first direction.

4. The bracket of claim 3 wherein said marginal portions are respectively located on the opposite side portions of said plate member.

5. The bracket of claim 4 wherein two leg members of said first set are formed by bending opposite marginal portions of said plate member in said first direction and wherein two leg members of said second set of leg members are formed by bending opposite marginal portions of said plate member in said second direction.

6. The bracket of of claim 5 wherein each marginal portion is bent to form at least one leg member of said first set and at least one leg member of said second set.

7. The bracket of claim 1 wherein said connecting means comprise tabs formed on said leg members for engaging a cooperating slot in said floor.

8. The bracket of claim 7 wherein said tabs are formed integrally with said leg members by bending the end portions of said leg members inwardly so that said tabs extend substantially perpendicular to said leg members.

9. The bracket of claim 7 wherein said tabs of said leg members of said second set make the same footprint on said floor as said tabs of said leg members of said first set.

10. The bracket of claim 9 wherein said tab of one leg member of said second set is adapted to engage the upper surface of said component when said tabs of said leg members of said first set of leg members are engaging said slot.

11. The bracket of claim 1 further comprising a mounting flange extending from said plate member for connecting said bracket to a wall of said housing.

12. A bracket for mounting a component in a housing defining an enclosed space of a predetermined height, said bracket comprising a plate member, a first set of at least two relatively long leg members extending from, and substantially perpendicular to, one surface of said plate member, a second set of at least two relatively short leg members extending from, and substantially perpendicular to the opposite surface of said plate member, a mounting flange extending from said plate member for connecting said bracket to a wall of said housing, tabs formed on said leg members of said first set for engaging a cooperating slot in the floor of said housing to support a component on said plate member at a predetermined height in said housing, and tabs formed on said leg members of said second set for engaging said cooperating slot in said floor to support a second component on said plate member of a height which, if mounted on said plate member with said leg members of said first set engaging said floor, would exceed said predetermined height.

13. The bracket of claim 12 wherein said mounting flange is formed integral with, and extends perpendicular to, said plate member.

14. The bracket of claim 12 further comprising at least one opening formed through said mounting flange, said mounting flange being constructed and arranged so that said opening aligns with a corresponding opening in said wall of said housing when said leg members of said first set are connected to said floor and when said leg members of said second set are connected to said floor.

15. The bracket of claim 14 wherein said at least one opening of said mounting flange is equally spaced between the ends of said leg members of said first set and the ends of said leg members of said second set.

16. A bracket for mounting a component in a housing, said bracket comprising a plate member for receiving said component, a first set of at least two leg members extending from, and substantially perpendicular to, one surface of said plate member, a second set of at least two leg members extending from, and substantially perpendicular to, the opposite surface of said plate member, and connecting means connectible to said housing for connecting said plate member in a first position in said housing with said leg members of said first set engaging the floor of said housing, said connecting means adapted to connect said plate member in a second position in said housing with said leg members of second set engaging said floor, said connecting means engaging the same portion of said housing in said first and second positions of said plate member.

17. The device of claim 16 further comprising means for connecting said leg members of said first and second set to said floor.

18. The device of claim 16 wherein said plate member and said leg members of each of said first and second sets form a receptacle for said component when the leg members of the other of said first and second sets engage said floor.

19. The bracket of claim 16 wherein said leg members are integral with said plate member and said leg members of said first set are formed by bending marginal portions of said plate member in a first direction, and said leg members of said second set are formed by bending marginal portions of said plate member in a second direction opposite said first direction.

20. The bracket of claim 19 wherein said marginal portions are respectively located on the opposite side portions of said plate member.

21. The bracket of claim 20 wherein two leg members of said first set are formed by bending opposite marginal portions of said plate member in said first direction and wherein two leg members of said second set of leg members are formed by bending opposite marginal portions of said plate member in said second direction.

22. The bracket of of claim 21 wherein each marginal portion is bent to form at least one leg member of said first set and at least one leg member of said second set.

23. The bracket of claim 17 wherein said means for connecting said leg members to said floor comprises tabs formed on said leg members for engaging a cooperating slot in said floor.

24. The bracket of claim 23 wherein said tabs are formed integrally with said leg members by bending the end portions of said leg members inwardly so that said tabs extend substantially perpendicular to said leg members.

25. The bracket of claim 23 wherein said tabs of said leg members of said second set make the same footprint on said floor as said tabs of said leg members of said first set.

26. The bracket of claim 25 wherein said tab of one leg member of said second set is adapted to engage the upper surface of said component when said tabs of said leg members of said first set of leg members are engaging said slot.

27. The bracket of claim 16 wherein said connecting means comprises a mounting flange extending perpendicular to said plate member for connecting said bracket to a wall of said housing.

28. The bracket of claim 27 further comprising at least one opening formed through said mounting flange, said mounting flange being constructed and arranged so that said opening aligns with a corresponding opening in said wall of said housing when said leg members of said first set are connected to said floor and when said leg members of said second set are connected to said floor.

29. The bracket of claim 28 wherein said at least one opening of said mounting flange is equally spaced between the ends of said leg members of said first set and the ends of the leg members of said second set of leg members.

30. The bracket of claim 16 wherein said leg members of said first set are of a different length than the leg members of said second set to mount components of different heights within said housing.

31. A bracket for mounting a component in a housing, said bracket comprising a plate member for receiving said component, a first set of at least two leg members extending from, and substantially perpendicular to, one surface of said plate member, a second set of at least two leg members extending from, and substantially perpendicular to, the opposite surface of said plate members, mounting members extending from each of said leg members, and means for connecting the mounting members of said leg members of one of said sets to the floor of said housing with a mounting member of a leg member of said other set extending over said component.

32. The bracket of claim 31 wherein said plate member is reversible so that the mounting members of said leg members of said other set are connectible to said floor.

33. The bracket of claim 31 wherein said leg members are integral with said plate member and said leg members of said first set are formed by bending marginal portions of said plate member in a first direction, and said leg members of said second set are formed by bending marginal portions of said plate member in a second direction opposite said first direction.

34. The bracket of claim 33 wherein said marginal portions are respectively located on the opposite side portions of said plate member.

35. The bracket of claim 34 wherein two leg members of said first set are formed by bending opposite marginal portions of said plate member in said first direction and wherein two leg members of said second set of leg members are formed by bending opposite marginal portions of said plate member in said second direction.

36. The bracket of claim 34 wherein each marginal portion is bent to form at least one leg member of said first set and at least one leg member of said second set of leg members.

37. The bracket of claim 31 wherein said mounting members comprises tabs formed integrally with said leg members by bending the end portions of said leg members inwardly so that said tabs extend substantially perpendicular to said leg members.

38. The bracket of claim 37 wherein said tabs of said leg members of said second set make the same footprint on said floor as said tabs of said leg members of said first set.

39. The bracket of claim 31 wherein said component extends between said leg members of said other set.

40. A bracket for mounting a component in a housing, said bracket comprising a plate member for receiving said component, a first set of at least two leg members extending from, and substantially perpendicular to, one surface of said plate member, a second set of at least two leg members extending from, and substantially perpendicular to, the opposite surface of said plate members, mounting members extending from each of said leg members, means for connecting the mounting members of said leg members of one of said sets to the floor of said housing with a mounting member of a leg member of said other set extending over said component, and a mounting flange extending from the said plate member for connecting the said bracket to a wall of said housing.

41. The bracket of claim 40 further comprising at least one opening formed through said mounting flange, said mounting flange being constructed and arranged so that said opening aligns with a corresponding opening in said wall of said housing when said leg members of said first set are connected to said floor and when said leg members of said second set are connected to said floor.

42. The bracket of claim 40 wherein said at least one opening of said mounting flange is equally spaced between the ends of said leg members of said first set of leg members and the ends of the leg members of said second set of leg members.

* * * * *

UNITED STATES PATENT AND TRADEMARK OFFICE
CERTIFICATE OF CORRECTION

PATENT NO. : 5,174,539
DATED      : December 29, 1992
INVENTOR(S) : John P. Leonard It is certified that error appears in the above-identified patent and that said Letters Patent is hereby corrected as shown below:

On the title page:

Item: [22] change "Filed: Oct. 6, 1991" to --Filed: June 6, 1991--.

Signed and Sealed this

Thirteenth Day of February, 2001

Attest:

NICHOLAS P. GODICI

Attesting Officer    *Acting Director of the United States Patent and Trademark Office*